(12) United States Patent
Lasyath et al.

(10) Patent No.: US 10,474,195 B2
(45) Date of Patent: Nov. 12, 2019

(54) METHOD OF PROVIDING INTERACTION IN WEARABLE DEVICE WITH A CURVED PERIPHERY

(71) Applicant: Samsung Electronics Co., Ltd., Suwon-si, Gyeonggi-do (KR)

(72) Inventors: Nabeel Mohamed Chemnad Lasyath, Via Kalanad (IN); Mani Selvakathiresan, Bangalore (IN); Sriram Shashank, Bangalore (IN); Nidhal Kottamoola Ibrahimkutty, Koonamthai (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/678,781

(22) Filed: Aug. 16, 2017

(65) Prior Publication Data

US 2018/0095501 A1    Apr. 5, 2018

(30) Foreign Application Priority Data

Oct. 5, 2016  (IN) .............................. 201641034028

(51) Int. Cl.
| | | |
|---|---|---|
| *G06F 3/0484* | (2013.01) | |
| *G06F 1/16* | (2006.01) | |
| *G06F 3/041* | (2006.01) | |
| *G06F 3/0488* | (2013.01) | |

(52) U.S. Cl.
CPC ............ *G06F 1/1643* (2013.01); *G06F 1/163* (2013.01); *G06F 1/1684* (2013.01); *G06F 3/0416* (2013.01); *G06F 3/0488* (2013.01)

(58) Field of Classification Search
CPC ...... G06F 1/1643; G06F 1/163; G06F 1/1684; G06F 3/04847; G06F 3/0488; G06F 3/0416
See application file for complete search history.

(56) References Cited

U.S. PATENT DOCUMENTS

| | | | |
|---|---|---|---|
| 6,477,117 B1* | 11/2002 | Narayanaswami | G04G 13/026 368/224 |
| 7,506,269 B2 | 3/2009 | Lang | |
| 2006/0092177 A1* | 5/2006 | Blasko | G04G 21/08 345/619 |
| 2009/0300541 A1* | 12/2009 | Nelson | G06F 3/0481 715/799 |
| 2010/0130256 A1* | 5/2010 | Yeh | G06F 3/0233 455/566 |
| 2010/0265172 A1 | 10/2010 | Sadahiro | |
| 2011/0157046 A1* | 6/2011 | Lee | G04G 21/08 345/173 |

(Continued)

FOREIGN PATENT DOCUMENTS

| | | | | |
|---|---|---|---|---|
| WO | WO2016/098418 | * | 6/2016 | ............ G06F 3/041 |
| WO | 2016-108537 A1 | | 7/2016 | |

*Primary Examiner* — Mihir K Rayan
(74) *Attorney, Agent, or Firm* — Jefferson IP Law, LLP

(57) ABSTRACT

A method of user interaction in a wearable device with a curved periphery is provided. The method includes displaying a blob when an item is displayed on the screen of the wearable device, obtaining a first input on the curved periphery associated with the blob, obtaining a second input along the curved periphery in conjunction with the first input, and performing an action in the item displayed on the screen of the wearable device.

20 Claims, 42 Drawing Sheets

(56) References Cited

U.S. PATENT DOCUMENTS

| | | | |
|---|---|---|---|
| 2015/0160856 A1 | 6/2015 | Jang et al. | |
| 2015/0363065 A1* | 12/2015 | Kim | G06F 3/0482 |
| | | | 715/739 |
| 2016/0239142 A1* | 8/2016 | Kim | G06F 3/0416 |
| 2017/0102855 A1* | 4/2017 | Kwon | G06F 3/04817 |
| 2017/0269715 A1* | 9/2017 | Kim | G06F 3/0362 |
| 2017/0329511 A1* | 11/2017 | Ueno | G06F 3/0488 |
| 2017/0371431 A1 | 12/2017 | Kim et al. | |

* cited by examiner

METHOD OF PROVIDING INTERACTION IN WEARABLE DEVICE WITH A CURVED PERIPHERY

CROSS-REFERENCE TO RELATED APPLICATION(S)

This application claims the benefit under 35 U.S.C. § 119(a) of an Indian patent application filed on Oct. 5, 2016 in the Indian Intellectual Property Office and assigned Serial number 201641034028, the entire disclosure of which is hereby incorporated by reference.

TECHNICAL FIELD

The present disclosure relates to wearable devices. More particularly, the present disclosure relates to a method of providing interaction in a wearable device with a curved periphery.

BACKGROUND

Wearable devices (such as smart watches, smart bands, and so on) are gaining importance due to their functionalities which provide additional level of convenience to a user. The user may interact with the wearable device for accessing application(s) or content through a touch input on a screen of the wearable device. However, the touch input for accessing the application(s) on a small screen of the wearable device may be cumbersome, as the user needs to provide the touch input on the small screen in order to access desired application(s).

In existing systems, additional hardware may be provided to the wearable device for accessing/controlling various features of applications in the wearable device. With the external hardware, the user can control various features of the applications, navigate among the applications, select an application from a plurality of applications, or the like. Hence, in the existing systems external hardware (for example, a crown or a bezel) is required for accessing/controlling various features of applications in the wearable device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of facilitating interaction in a wearable device with a curved periphery.

Another aspect of the present disclosure is to provide a method for interacting with item(s) in the wearable device without external hardware.

Another aspect of the present disclosure is to provide a method for interacting with item(s) in the wearable device through directional gestures/rotational gestures performed on the curved periphery of the wearable device.

Another aspect of the present disclosure is to provide an interaction trigger (i.e., a blob) in the screen of the wearable device for interacting with item(s) through directional gestures/rotational gestures.

In accordance with an aspect of the present disclosure, a method of user interaction in a wearable device with a curved periphery is provided. The method includes causing to display a blob when an item is displayed on the screen of the wearable device, obtaining a first input on the curved periphery associated with the blob, obtaining a second input along the curved periphery in conjunction with the first input, and performing an action in the item displayed on the screen of the wearable device.

In an embodiment, performing the action in the item on the screen of the wearable device includes causing to vary one or more features of an item displayed on the screen of the wearable device, in accordance with the second input.

In an embodiment, performing the action in the item on the screen of the wearable device includes causing to render a portion of the item displayed in the screen of the wearable device, in accordance with the second input.

In an embodiment, performing the action in the item on the screen of the wearable device includes causing to change the item displayed on the screen of the wearable device, in accordance with the second input.

In an embodiment, the blob is displayed at a pre-determined region on the screen of the wearable device.

In an embodiment, a plurality of the blobs are displayed at pre-determined regions on the screen of the wearable device.

The method may include displaying a plurality of items on the screen of the wearable device. Each item from the plurality of items may be selected in accordance with the first input on the curved periphery associated with each blob.

In an embodiment, the at least one feature of the selected item varies in accordance with the second input along the curved periphery of the wearable device in conjunction with the first input.

In accordance with another aspect of the present disclosure, a computer program product is provided. The computer program product includes computer executable program code recorded on a computer readable non-transitory storage medium, the computer executable program code when executed causing the actions including causing to display a blob when an item is displayed on a screen of a wearable device, obtaining a first input on a curved periphery associated with the blob, obtaining a second input along the curved periphery in conjunction with the first input, and performing an action in the item displayed on the screen of the wearable device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
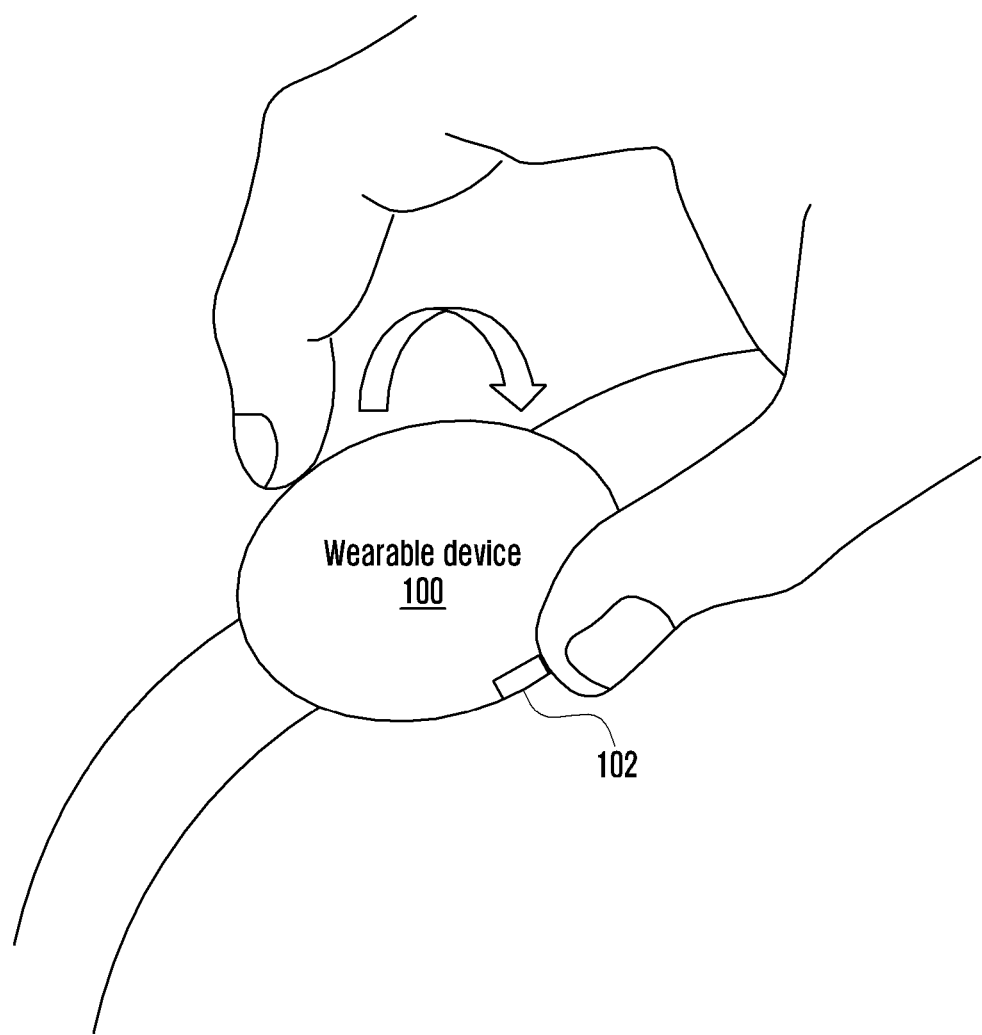
FIG. 1 illustrates a wearable device with a curved periphery, in which a blob is displayed according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the description, the term "item" non-exclusively refers to, an application such as contact application, a calendar application, a social networking site (SNS) application, a gallery application, a video application, a message application, a game application, a clock, an application icon, or any other application available/installed in the wearable device.

The embodiments herein provide a method of user interaction in a wearable device with a curved periphery. The method includes causing to display a blob when an item is displayed on the screen of the wearable device, obtaining a first input on the curved periphery associated with the blob, obtaining a second input along the curved periphery in conjunction with the first input, and performing an action in the item displayed on the screen of the wearable device.

Unlike methods of the related art, a proposed method eliminates the need for additional hardware (such as a bezel or a crown) to the wearable device by displaying the visual element (i.e., an interaction trigger) on the screen of the wearable device. According to various embodiments of the present disclosure, the visual element may mean a blob. Unlike edge based gestures of the related art, with the proposed method, the user can perform gestures such as a spin gesture, a wheel gesture, a swipe gesture along the curved periphery for interacting with the item(s) displayed on the screen of the wearable device. With a proposed method, the small screen of the wearable device can be effectively utilized with the interaction trigger and directional/rotational gestures (such as the spin gesture, and the swipe gesture) along the curved periphery. With the directional/rotational gestures, a better user interaction with the wearable device is achieved, unlike to the gestures performed on small screen of the wearable device according to the related art. The directional/rotational gestures are performed along the curved periphery of the wearable device which provides additional level of convenience to a user.

Referring now to the drawings, there are shown preferred embodiments.

FIG. 1 illustrates a wearable device with a curved periphery, in which a blob is displayed according to an embodiment of the present disclosure.

Referring to FIG. 1, a wearable device 100 displays a blob 102 on the screen. The wearable device 100 has a curved periphery (i.e., a curved edge around the screen of the wearable device 100). Although not shown in FIG. 1, the wearable device displays the blob 102 on the screen when an item is displayed on the screen of the wearable device 100. The blob 102 is a graphical element without a pre-defined shape and acts as an interaction trigger to interact with the item displayed on the screen of the wearable device 100.

In an embodiment, the blob 102 is displayed in the pre-determined region on the screen of the wearable device 100.

In an embodiment, the pre-determined region, in which the blob 102 is displayed on the screen of the wearable device 100, is configurable based on user preference.

The wearable device 100 obtains the first input (indicated with a thumb as shown in FIG. 1) on the curved periphery associated with the blob 102. Further, the wearable device 100 obtains the second input (indicated with an index finger) along the curved periphery in conjunction with the first input. When the wearable device 100 obtains the second input in conjunction with the first input, the wearable device performs an action on the item(s) displayed in the wearable device 100. The various actions performed on the item(s) displayed on the screen of the wearable device 100 are explained in conjunction with the figures in the later parts of the description.

According to various embodiments of the present disclosure, the first input and the second input may be an input for controlling the same item. For example, the first input may be an input to change the feature of the item by a first unit, the second input may be an input to change the feature of the item by a second unit. The first unit and the second unit may mean different units. For example, the first unit may mean a unit larger than the second unit. The user can quickly change the feature of the item using the first input, and the user can finely change the feature of the item using the second input.

According to another embodiment of the present disclosure, a touch sensor can be disposed at an edge of the wearable device 100. Furthermore, the wearable device 100 may receive the first input and the second input using the touch sensor disposed at an edge of the wearable device.

According to various embodiment of the present disclosure, the first input and the first is a touch input on the edge of the display. For example, the wearable device can receive the first input and the second input on the visual element, the visual element is displayed on the edge of the display.

According to various embodiment of the present disclosure, the wearable device 100 can comprise an interaction unit adjacent to the periphery of the display. For example, the interaction unit can mean a rotatable bezel. The rotatable bezel can receive a user input by rotating the rotatable bezel in clockwise or counter clockwise direction. The wearable device 100 can receive the user input (i.e. the first input, the second input) on the rotatable bezel.

According to various embodiment of the present disclosure, the interaction unit can mean a bezel including a touch sensor. If the bezel includes the touch sensor, the user input on the bezel can mean the touch input on at least part of the bezel. For example, the touch-sensor included in the interaction unit can be a touch-sensor included in the display. As another example, the touch sensor included in the interaction unit can be a touch sensor different from the touch sensor included in the display.

Figure 2:
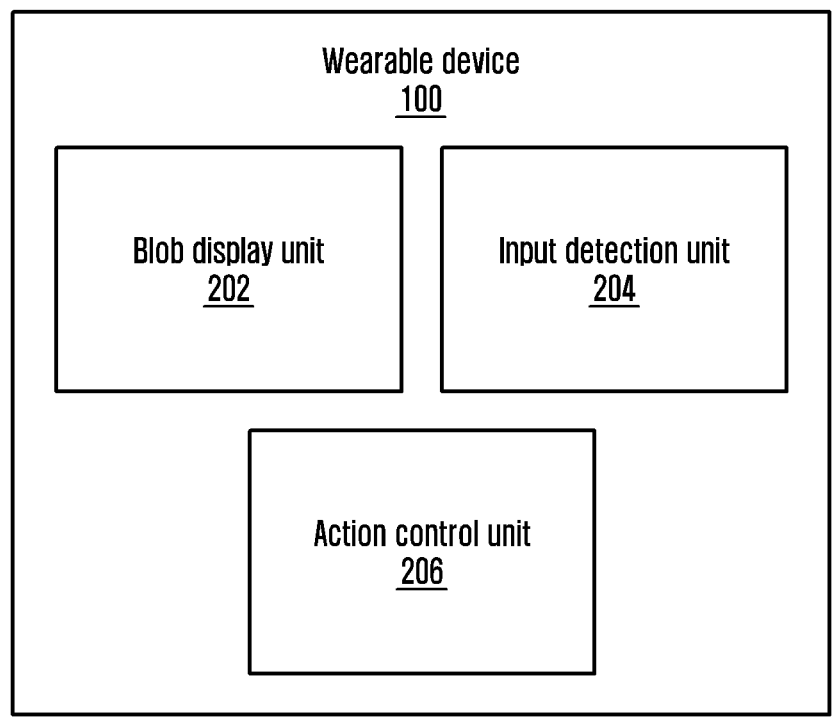
FIG. 2 illustrates various units in the wearable device described in FIG. 1 according to an embodiment of the present disclosure.

FIG. 2 illustrates various units in a wearable device described in FIG. 1 according to an embodiment of the present disclosure.

Referring to FIG. 2, the wearable device 100 includes a blob display unit 202, an input recognition unit 204, and an action control unit 206.

The blob display unit 202 displays the blob 102 in a pre-determined region on the screen of the wearable device 100. The blob 102 is a graphical element without any pre-defined shape and acts as an interaction trigger to interact with an item displayed on the screen of the wearable device 100. In an example, the blob 102 is displayed on the screen of the wearable device 100.

In an embodiment, the pre-determined region, in which the blob 102 is displayed on the screen of the wearable device 100, is configurable.

In an embodiment, the pre-determined region, in which the blob 102 is displayed on the screen of the wearable device 100, is customizable.

In an embodiment, the blob display unit 202 displays a plurality of blobs in pre-determined regions on the screen of the wearable device 100. The pre-determined regions, in which the plurality of blobs are respectively displayed on the screen of the wearable device 100, are configurable.

The input detection unit 204 detects the input on the curved periphery of the wearable device 100. The input on the curved periphery can be in the form of a gesture such as a spin gesture, a wheel gesture, a swipe gesture, or the like.

In an embodiment, the input on the curved periphery can be a hover.

The input detection unit 204 detects the first input obtained on the curved periphery associated with the blob 102. Further, the input detection unit 204 detects the second input obtained along the curved periphery of the wearable device 100.

The action control unit 206 controls one or more actions performed in the wearable device 100 in accordance with the second input along the curved periphery, and in conjunction with the first input on the curved periphery associated with the blob 102. Example actions include causing to vary at least one feature of an item, causing to render a portion of the item, and causing to change the item, in accordance with the second input along the curved periphery. Example actions performed in the wearable device are explained in conjunction with the later parts of description.

Figure 3A:
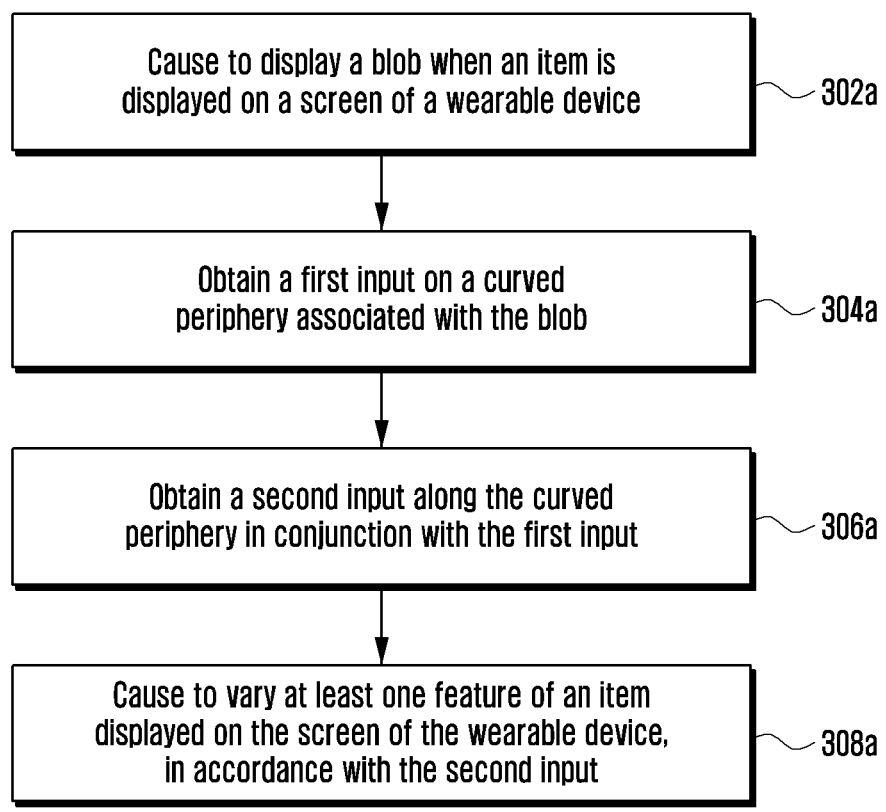
FIG. 3A is a flow diagram illustrating a method of providing user interaction in a wearable device with a curved periphery according to an embodiment of the present disclosure.

FIG. 3A is a flow diagram illustrating a method of providing user interaction in a wearable device with a curved periphery according to an embodiment of the present disclosure.

Referring to FIG. 3A, the method includes causing to display the blob 102 when an item is displayed on a screen of the wearable device 100 at operation 302a. The method allows the blob display unit 202 to cause to display the blob 102 when the item is displayed on the screen of the wearable device 100. The blob 102 is a graphical element without any pre-defined shape and acts as an interaction trigger to interact with the item displayed on the screen of the wearable device 100. The blob 102 can be displayed in the pre-determined region on the screen of the wearable device 100.

In an embodiment, the pre-determined region in which the blob 102 is displayed on the screen of the wearable device 100 is configurable.

In an embodiment, the blob 102 is displayed along with the item displayed on the screen of the wearable device 100. In an example, the blob 102 is displayed when the wearable device 100 displays an analog clock.

In an embodiment, the blob 102 is displayed when the region of the curved periphery corresponding to the blob 102 is touched for a first instance. In an example, when the touch input is provided on the region of the curved periphery corresponding to the blob 102, the blob 102 is displayed on the screen of the wearable device 100 without displaying an item on the screen of the wearable device 100.

At operation 304*a*, the method includes obtaining the first input on the curved periphery associated with the blob 102. The method allows the input detection unit 204 to obtain the first input on the curved periphery associated with the blob 102. The first input can be for example, a tap and hold input, or a long press input on the curved periphery associated with the blob 102. The region of the curved periphery covering the area of the blob 102 displayed in the screen is touched to activate the blob 102 displayed on the screen of the wearable device 100. The blob 102 is activated when the region of the curved periphery covering the area of the blob 102 displayed in the screen is touched for the first instance. In an embodiment, when the blob 102 is activated, the item currently displayed in the wearable device 100 is selected. In order to select another item, the region of the curved periphery covering the area of the blob 102 displayed in the screen can be touched again.

At operation 306*a*, the method includes obtaining the second input along the curved periphery in conjunction with the first input. The method allows the input detection unit 204 to obtain the second input along the curved periphery in conjunction with the first input. When the first input is obtained on the curved periphery corresponding to the blob 102, the second input is obtained along the curved periphery (which is adjacent to the curved periphery where the first input is obtained), in conjunction with the first input. The second input can include a swipe gesture, a spin gesture, a wheel gesture, or the like.

At operation 308*a*, the method includes causing to vary one or more features of the item displayed on the screen of the wearable device 100, in accordance with the second input. The method allows the action control unit 206 to vary the one or more features of the item displayed on the wearable device 100. In an example, if the item is a media application, then the feature of the media application such as volume is varied in accordance with the second input along the curved periphery. In an example, if the item is a clock, then a minute hand of the clock or an hour hand of the clock is varied in accordance with the second input along the curved periphery.

The various actions, acts, blocks, steps, operations, or the like in the method may be performed in the order presented, in a different order, or simultaneously. Further, in some embodiments, some of the actions, acts, blocks, steps, operations, or the like may be omitted, added, modified, skipped, or the like without departing from the scope of the present disclosure.

Figure 3B:
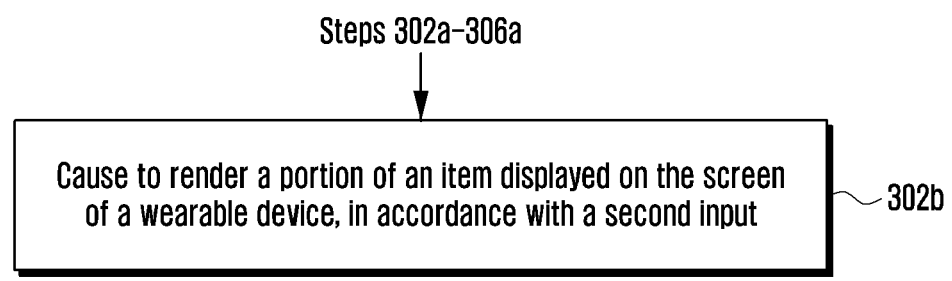
FIG. 3B is a flow diagram illustrating a method for rendering a portion of an item displayed on a screen of a wearable device, according to an embodiment of the present disclosure.

FIG. 3B is a flow diagram illustrating a method for rendering a portion of the item displayed on the screen of the wearable device according to an embodiment of the present disclosure.

Referring to FIG. 3B, initially the operations 302*a*-306*a* as described in FIG. 3A are performed. At operation 302*b*, the method includes causing to render the portion of an item displayed on the screen of a wearable device, in accordance with the second input. The method allows the action control unit 206 to cause to render the portion of an item displayed on the screen of a wearable device, in accordance with the second input. In an example, an item displayed in the wearable device 100 is a notification message. A first portion of text in the notification message is rendered on the screen of wearable device 100 in accordance with the second input. Further, a second portion of text in the notification message is rendered on the screen of wearable device 100 in accordance with the second input. In a similar manner, the entire text in the notification message is rendered on the screen of wearable device 100 in accordance with the second input. Rendering of the portion of text in the notification message is explained with an example in FIGS. 6A to 6C.

The various actions, acts, blocks, steps, operations, or the like in the method may be performed in the order presented, in a different order or simultaneously. Further, in some embodiments, some of the actions, acts, blocks, steps, operations, or the like may be omitted, added, modified, skipped, or the like without departing from the scope of the present disclosure.

Figure 3C:
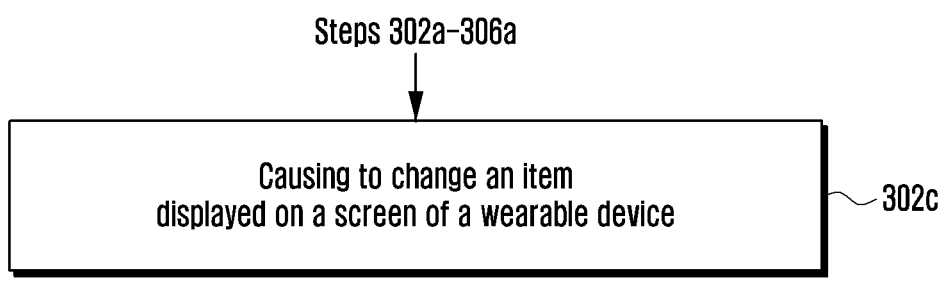
FIG. 3C is a flow diagram illustrating a method for changing an item displayed on a screen of a wearable device according to an embodiment of the present disclosure.

FIG. 3C is a flow diagram illustrating a method for changing the item displayed on the screen of the wearable device according to an embodiment of the present disclosure.

Referring to FIG. 3C, initially the operations 302*a*-306*a* as described in FIG. 3A are performed.

At operation 302*c*, the method includes causing to change the item displayed on the screen of the wearable device 100, in accordance with the second input. The method allows the action control unit 206 to cause to change the item displayed on the screen of the wearable device 100. In an embodiment, multiple first inputs on the curved periphery associated with the blob 102 cause to change the item displayed on the screen of the wearable device 100. In an example, the wearable device 100 may display a contact application. When a tap and hold input is provided on the curved periphery, the contact application changes to a media application. In a similar manner, when the first input (such as a tap and hold) is provided on the curved periphery associated with the blob 102, the item currently displayed in the wearable device is changed. An example illustration for changing the item displayed in the wearable device 100 is provided in FIGS. 10A to 10C.

The various actions, acts, blocks, steps, operations, or the like in the method may be performed in the order presented, in a different order or simultaneously. Further, in some embodiments, some of the actions, acts, blocks, steps, operations, or the like may be omitted, added, modified, skipped, or the like without departing from the scope of the present disclosure.

FIGS. 4A to 4D are example illustrations of changing a time in an analog clock with a user interaction according to various embodiments of the present disclosure.

Figure 4A:
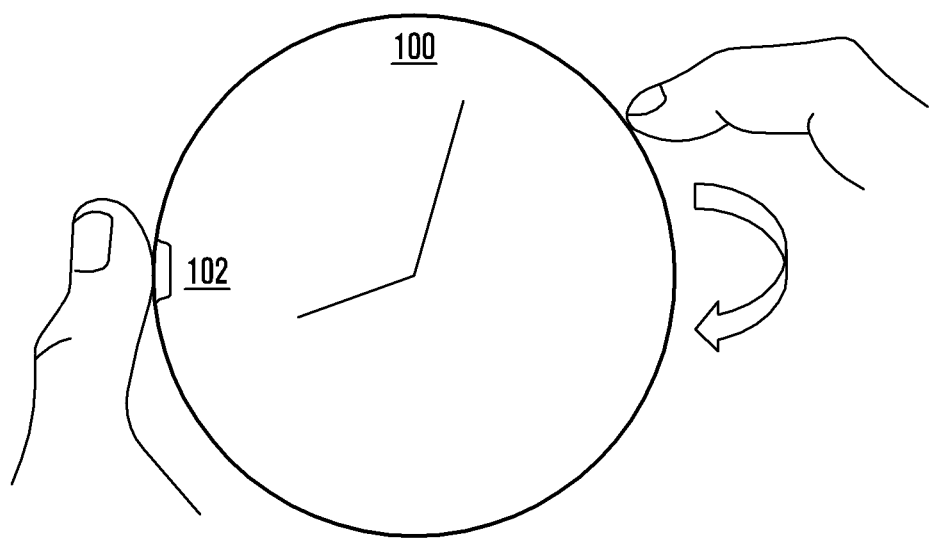
FIGS. 4A to 4D are example illustrations of changing a time in an analog clock with a user interaction according to various embodiments of the present disclosure.

Referring to FIG. 4A, a tap and hold gesture (indicated with a user's thumb) is performed on the curved periphery associated with the blob 102. When the tap and hold gesture is performed on the curved periphery, the minute hand of the clock is selected. In order to select the hour hand of the analog clock, the user needs to provide the tap and hold gesture again on the curved periphery associated with the blob 102.

Figure 4B:
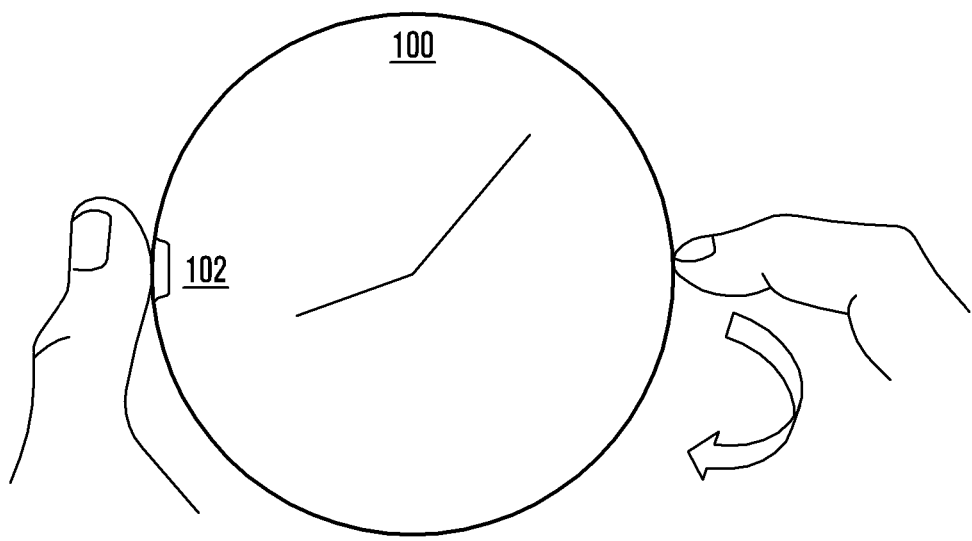

Referring to FIG. 4B, when the user performs a directional/rotational gesture along the curved periphery (e.g., a wheel gesture), in conjunction with the tap and hold input, the position of the minute hand is varied in accordance with the wheel gesture.

Figure 4C:
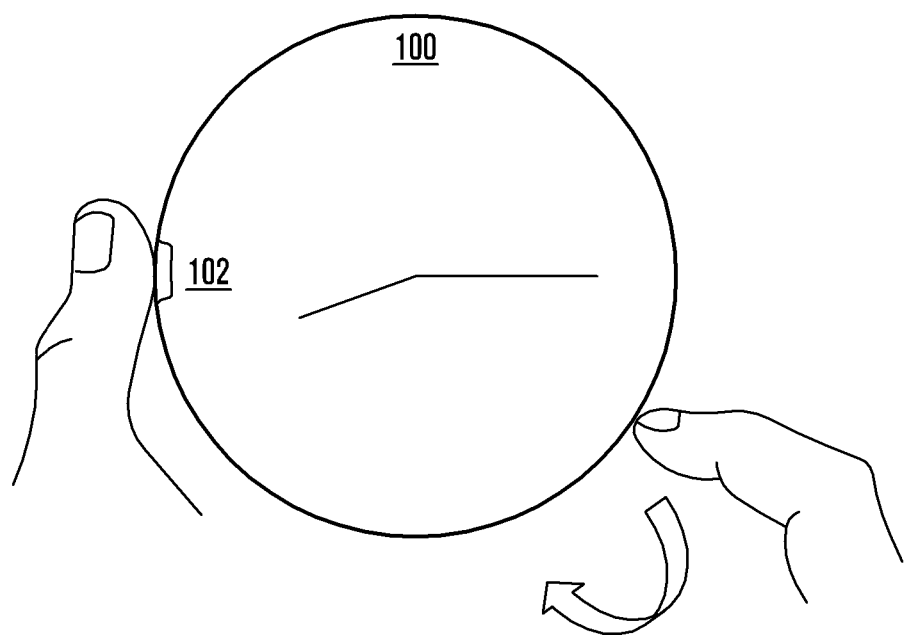

When the user continues to perform the directional gesture along the curved periphery, in conjunction with the tap and hold gesture, the position of the minute hand is varied in accordance with wheel gesture as shown in FIG. 4C.

Figure 4D:
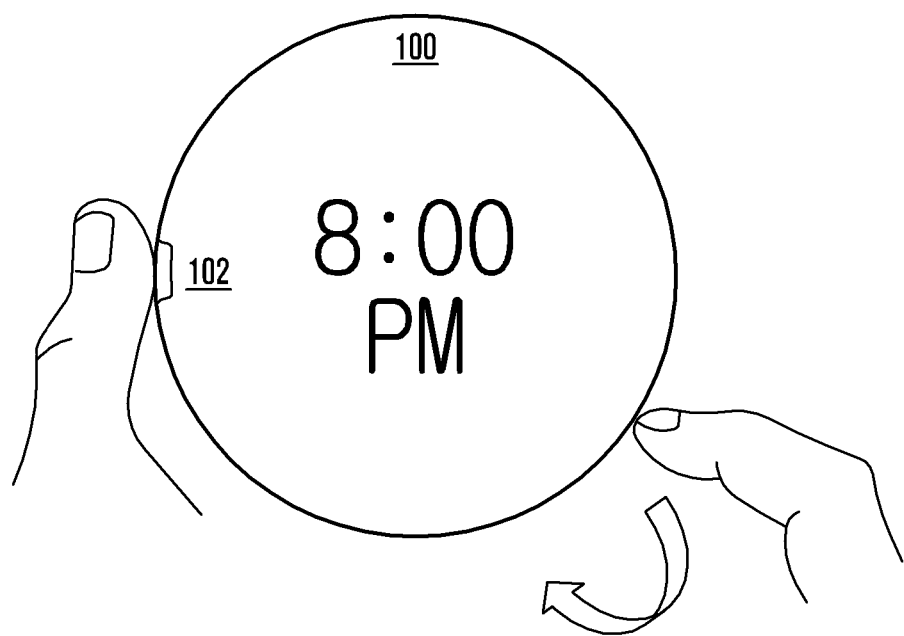

Referring to FIG. 4D, when the user performs a directional/rotational gesture along the curved periphery, in conjunction with the tap and hold input, the configuration of the clock displayed in the display may be changed. For example, the configuration of the analog clock (i.e., FIG. 4A) can be changed to a configuration of a digital clock in response to receiving the directional/rotational gesture along the curved periphery.

Figure 5A:
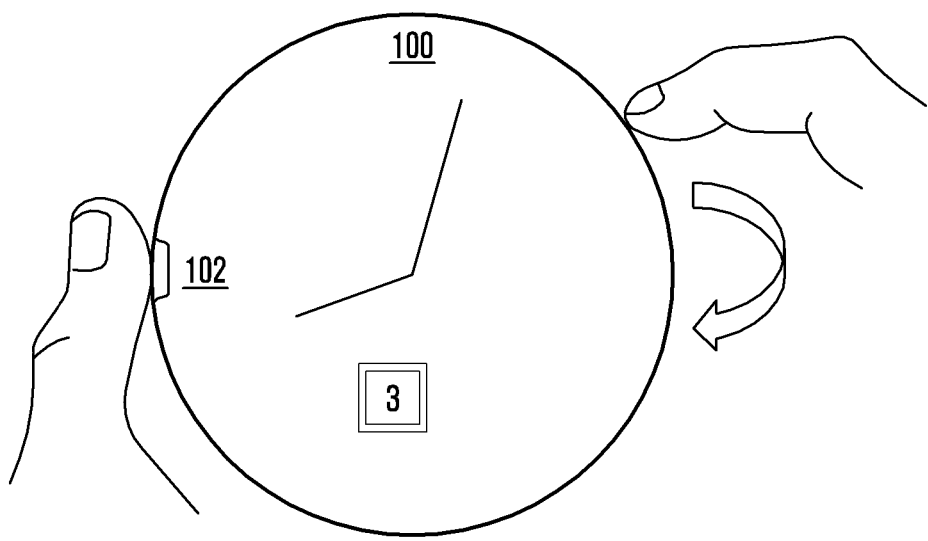
FIGS. 5A to 5C are example illustrations of changing a date in a wearable device with a user interaction according to various embodiments of the present disclosure.
Figure 5B:
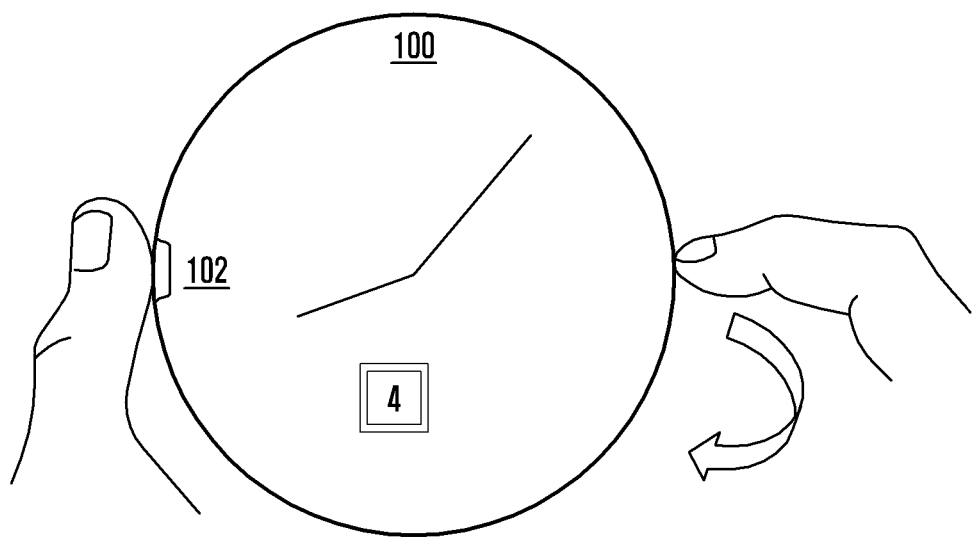
Figure 5C:
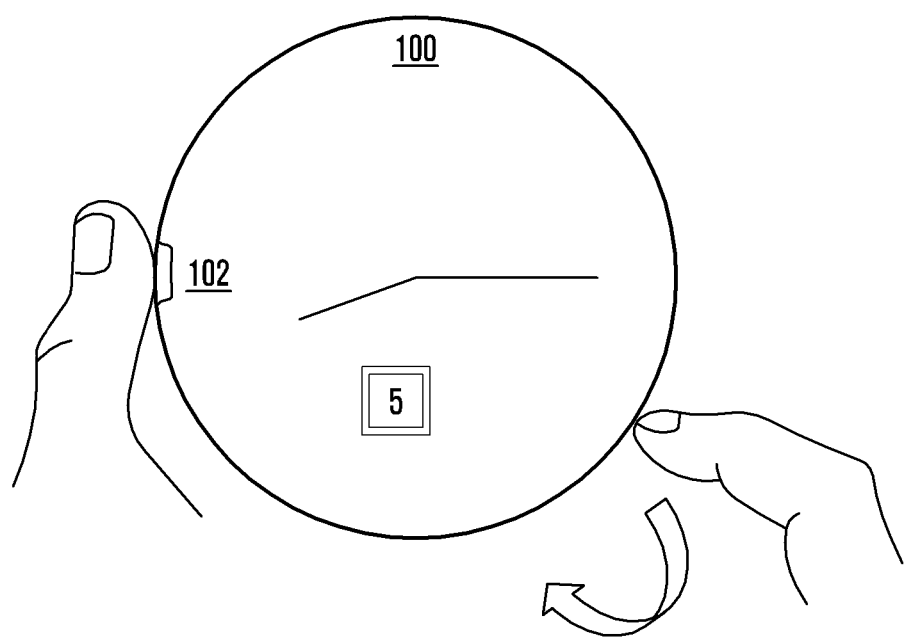

FIGS. 5A to 5C are example illustrations of changing a date in a wearable device with a user interaction according to various embodiments of the present disclosure.

Referring to FIG. 5A, a tap and hold gesture (indicated with a user's thumb) is performed on the curved periphery in the region corresponding to the blob display. When the tap and hold gesture is performed on the curved periphery, the date '3' (as shown in FIG. 5A) is displayed on the screen of the wearable device 100.

Referring to FIG. 5B, when the user performs the directional gesture along the curved periphery, in conjunction with the first input, the date is changed to '4' as shown FIG. 5B, based on the amount of movement of the directional gesture.

When the user continues to perform the directional gesture along the curved periphery, in conjunction with the tap and hold gesture, the date is changed to '5', based on the amount of movement of the directional gesture as shown in FIG. 5C.

Figure 6A:
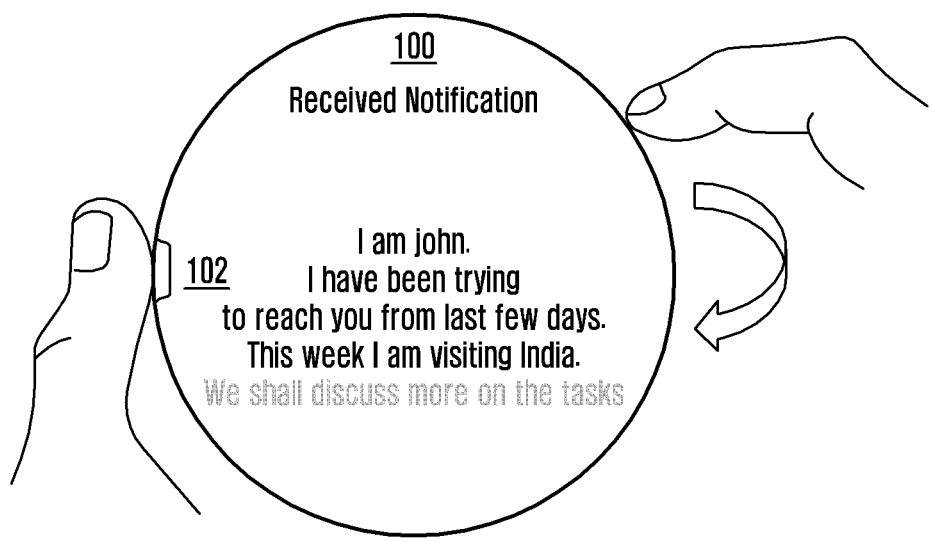
FIGS. 6A to 6C are example illustrations in which a notification received in a wearable device is accessed with a user interaction according to various embodiments of the present disclosure.
Figure 6B:
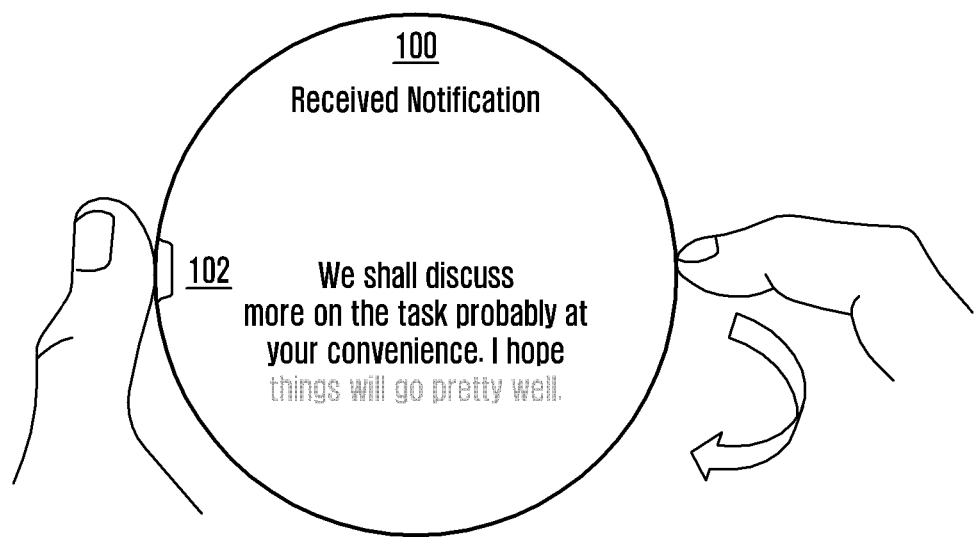
Figure 6C:

FIGS. 6A to 6C are example illustrations in which a notification is received in a wearable device is accessed with a user interaction according to various embodiments of the present disclosure.

Referring to FIG. 6A, a tap and hold (indicated with a user's thumb) gesture is performed on the curved periphery associated with the blob 102, when the notification is displayed on the screen of the wearable device 100.

Referring to FIG. 6B, when the user performs a directional gesture along the curved periphery, in conjunction with the tap and hold gesture, the text in the notification is scrolled based on the amount of movement of the directional gesture.

When the user continues to perform the directional gesture along the curved periphery, in conjunction with the tap and hold gesture, the text in the notification is scrolled further, based on the amount of movement of the directional gesture as shown in FIG. 6C.

Figure 7A:
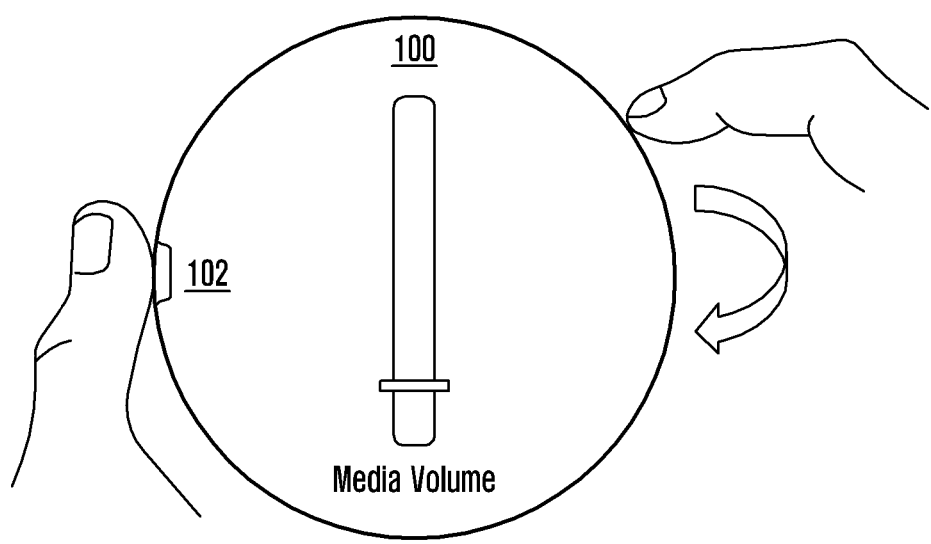
FIGS. 7A to 7C are example illustrations in which a volume of a media application is varied with a user interaction according to various embodiments of the present disclosure.
Figure 7B:
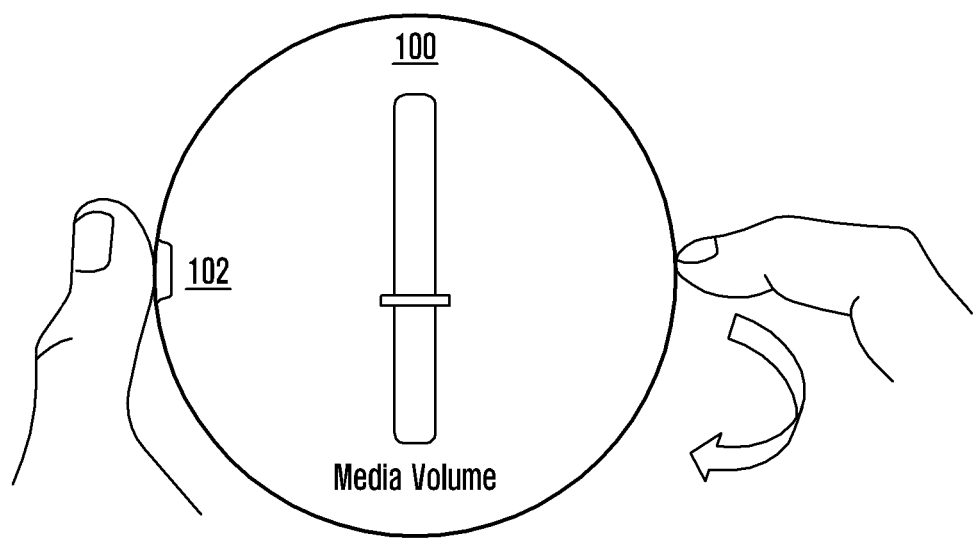
Figure 7C:
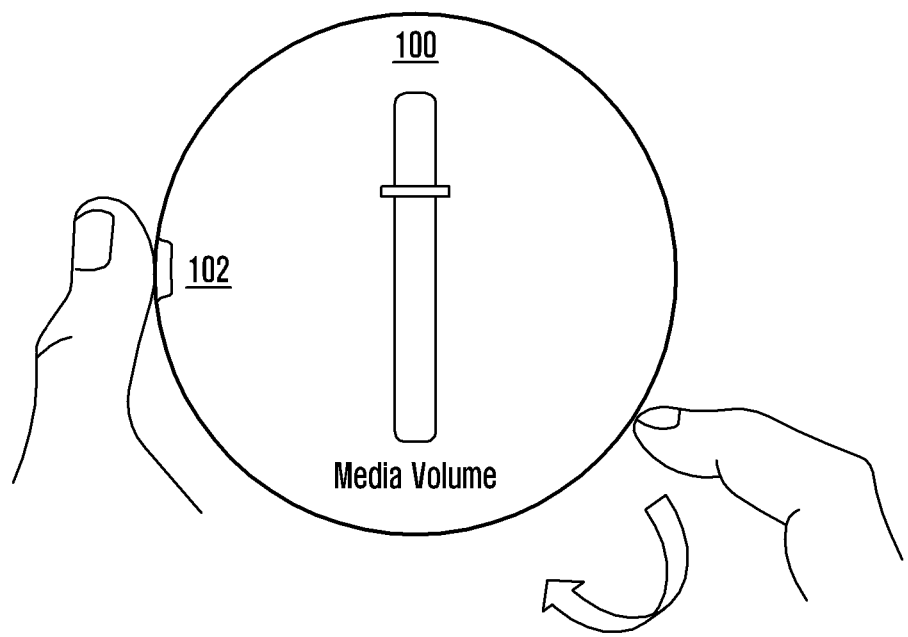

FIGS. 7A to 7C are example illustrations in which a volume of a media application is varied with a user interaction according to various embodiments of the present disclosure.

Referring to FIG. 7A, a tap and hold gesture (indicated with a user's thumb) is performed on the curved periphery when the volume feature of the media application is displayed on the screen of the wearable device 100.

Referring to FIG. 7B, when the user performs a directional gesture along the curved periphery, in conjunction with the tap and hold gesture, the volume of the media application is increased with the increase in the amount of movement of the directional gesture downwards.

When the user continues to perform the directional gesture along the curved periphery, in conjunction with the first input, the volume of the media application is increased further based on the increase in the amount of movement of the directional gesture downwards as shown in FIG. 7C.

It should be understood by a person of ordinary skill in the art that the volume can be decreased based on the decrease in the amount of movement of the directional gesture upwards.

Figure 8A:
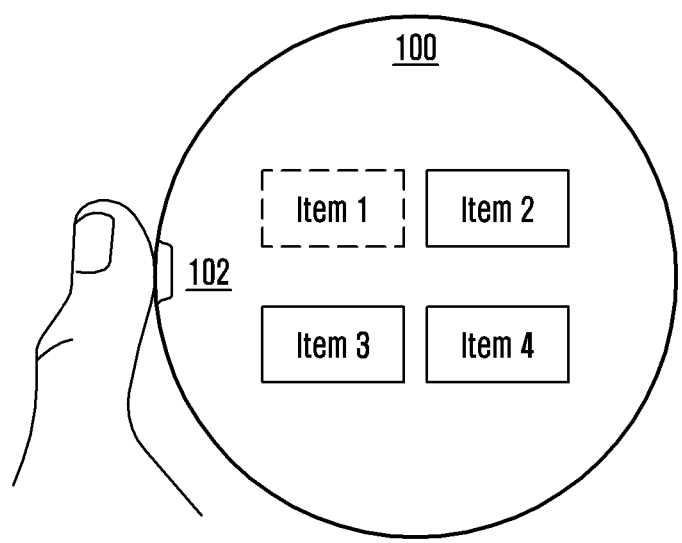
FIGS. 8A to 8C are example illustrations in which an item is selected from a plurality of items in a wearable device with user interaction according to various embodiments of the present disclosure.
Figure 8B:
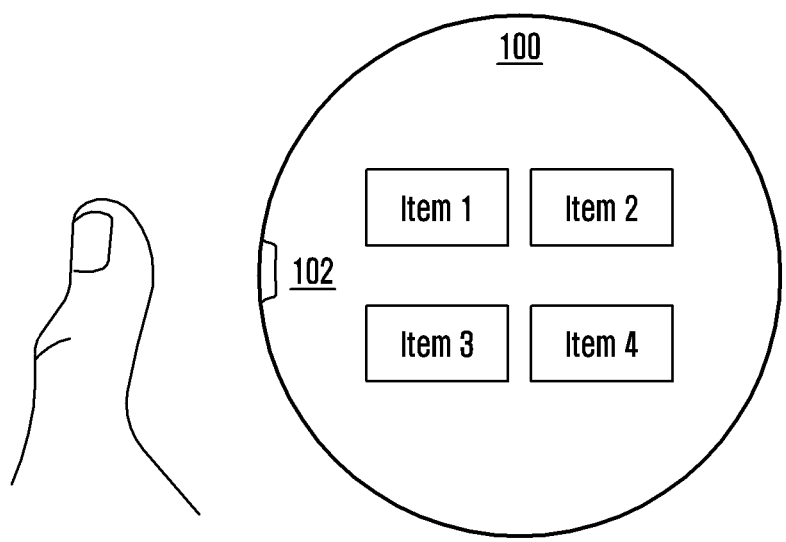
Figure 8C:
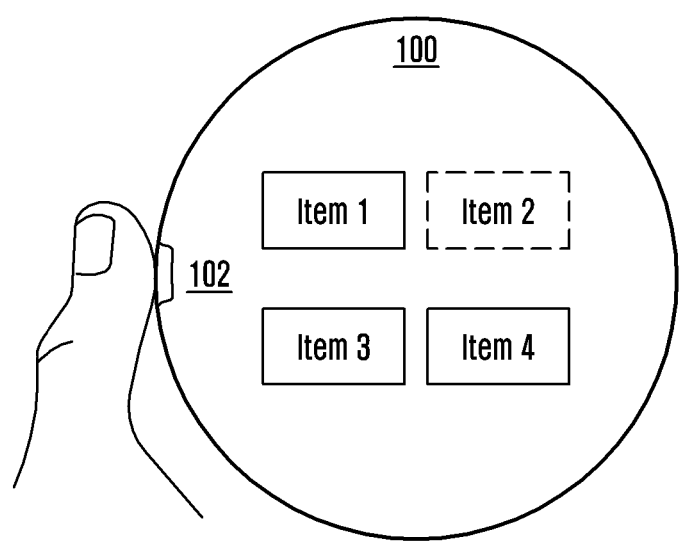

FIGS. 8A to 8C are example illustrations in which an item is selected from a plurality of items in a wearable device with a user interaction, according to various embodiments of the present disclosure.

Referring to FIG. 8A, the wearable device 100 displays a plurality of items such as item 1, item 2, item 3, and item 4. A tap and hold gesture (indicated with a user's thumb) is performed on the curved periphery associated with the blob 102. When the tap and hold gesture is performed on the curved periphery, the item 1 is selected, as shown in the dotted lines. When the thumb is released from the curved periphery, all of the plurality of items are displayed on the screen and there is no selection of an item as shown in FIG. 8B.

Further, when the user desires to select item 2, then the user again performs the tap gesture on the blob 102, which allows the user to select the item 2. Then, the user can vary the feature of item 2 by performing the directional gesture along the curved periphery in conjunction with the first input.

The user can select item 3 by again performing the tap gesture on the blob 102.

FIGS. 9A to 9D are example illustrations in which an item is selected from a plurality of items based on a plurality of blobs displayed in a wearable device according to various embodiments of the present disclosure.

Figure 9A:
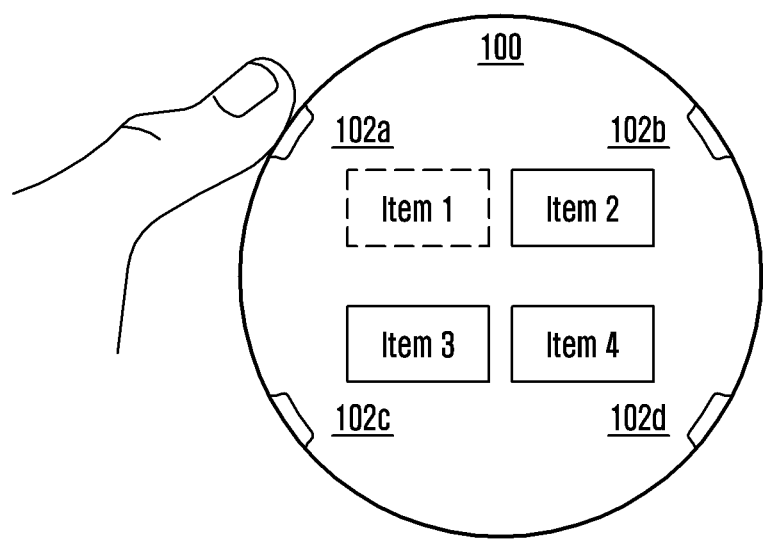
FIGS. 9A to 9D are example illustrations in which an item is selected from a plurality of items based on a plurality of blobs displayed in a wearable device according to various embodiments of the present disclosure.

Referring to FIGS. 9A to 9D, the wearable device 100 displays a plurality of blobs, namely blob 102a, blob 102b, blob 102c, and blob 102d on the screen of the wearable device 100 as shown in FIG. 9A. When the first input (indicated with a user's thumb) is obtained on the curved periphery associated with the blob 102a, the item 1 is selected.

Figure 9B:
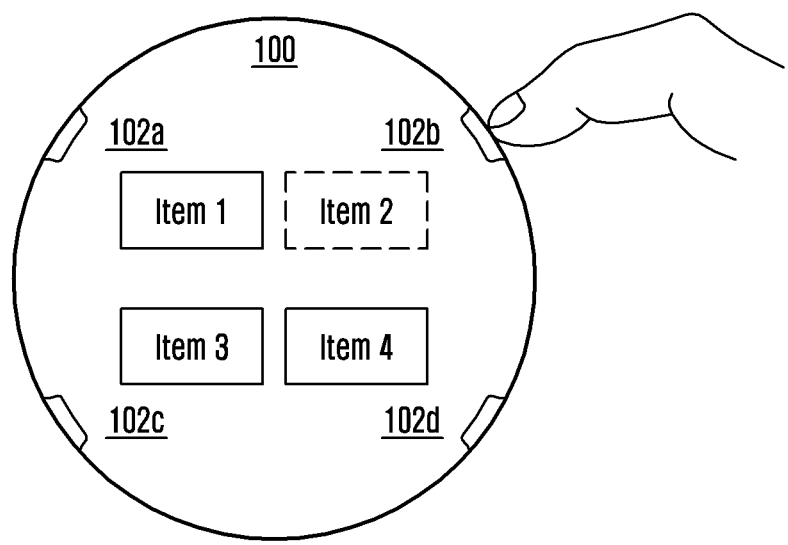
Figure 9C:
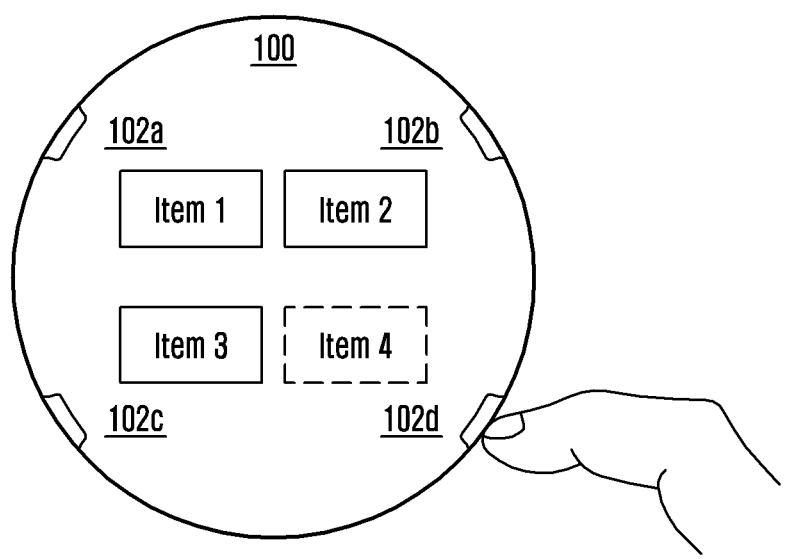
Figure 9D:
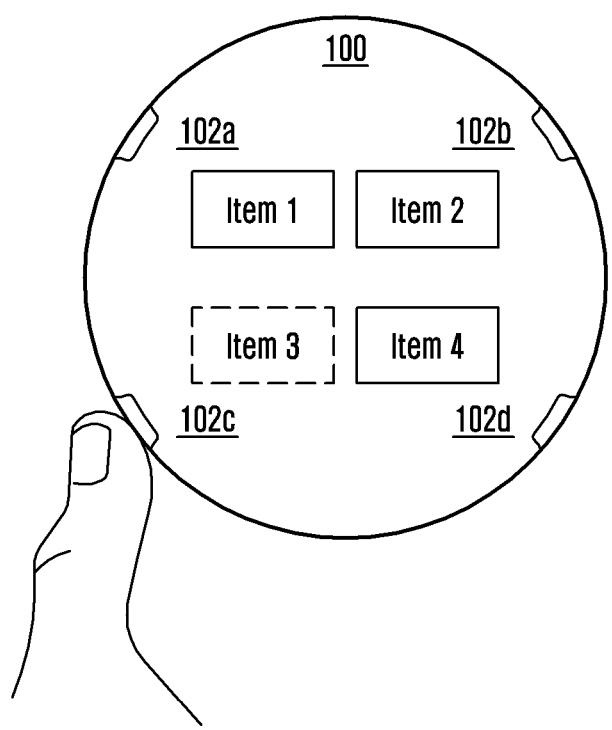

Referring to FIG. 9B, when the first input (indicated with a user's thumb) is obtained on the curved periphery associated with the blob 102b, the item 2 is selected. Referring to FIG. 9C, when the user performs a tap and hold gesture (indicated with a user's thumb) on the curved periphery associated with the blob 102c, the item 3 is selected. Referring to FIG. 9D, when the user performs the tap and hold gesture (indicated with a user's thumb) on the curved periphery associated with the blob 102d, the item 4 is selected. Thus, each item from the plurality of items is selected in accordance with the tap and hold gesture on the curved periphery associated with each blob as shown in FIGS. 9A to 9D. Displaying the blob can be set based on the context. For example, the number of blobs displayed may vary depending on the number of items.

Figure 10A:
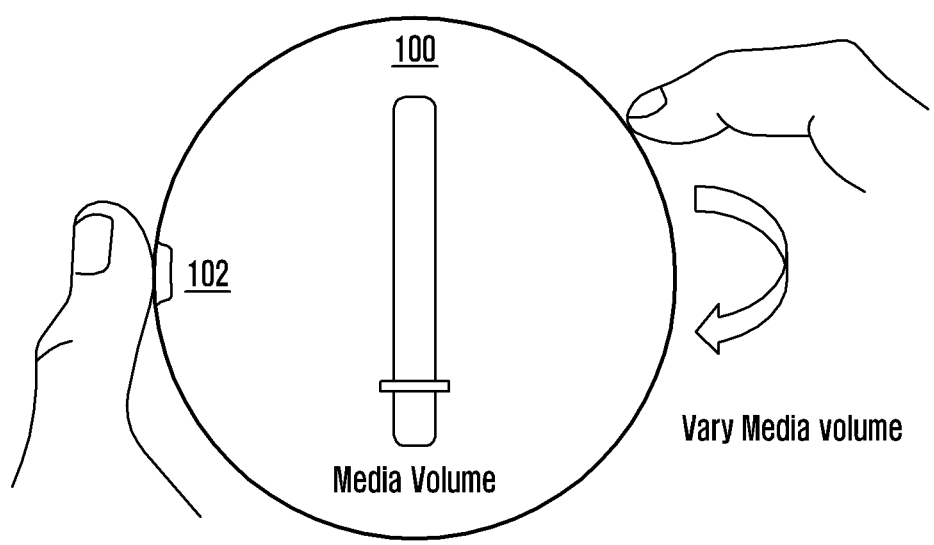
FIGS. 10A to 10C are example illustrations in which an item displayed in a wearable device is changed using a blob shown in FIG. 1 according to various embodiments of the present disclosure.
Figure 10B:
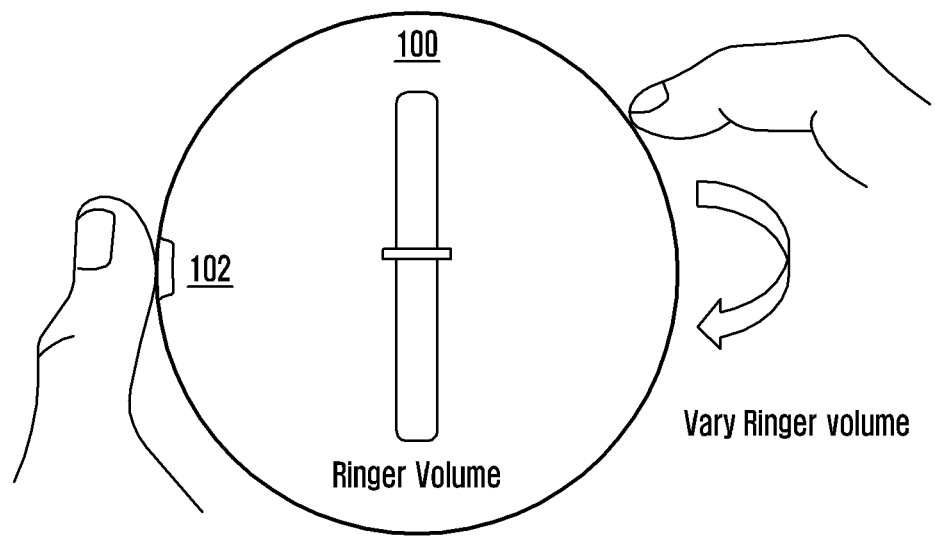
Figure 10C:
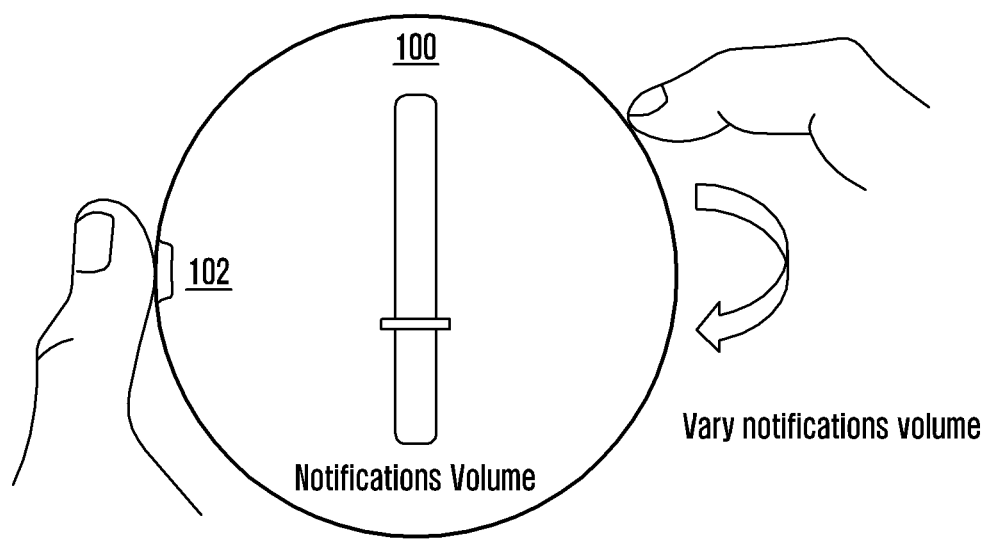

FIGS. 10A to 10C are example illustrations in which an item displayed in a wearable device is changed using a blob shown in FIG. 1, according to various embodiments of the present disclosure.

Referring to FIG. 10A, the wearable device 100 displays a blob 102 along with a volume feature of a media application on the screen of the wearable device 100. The volume of the media application can be varied in accordance with a wheel gesture performed along the curved periphery as shown in FIG. 10A.

In order to change the item displayed on the screen of the wearable device 100, a tap and hold gesture is performed on the curved periphery associated with blob 102. When the first input is provided, the wearable device displays a ringer volume as shown in FIG. 10B. The ringer volume can be raised or lowered based on the directional gesture performed along the curved periphery as shown in FIG. 10B.

Further, when the user again performs the tap and hold gesture on the curved periphery associated with blob 102, the wearable device 100 displays a notifications volume as shown in FIG. 10C. The notifications volume can be raised or lowered based on the directional gesture performed along the curved periphery as shown in FIG. 10C.

According to various embodiments of the present disclosure, the user can change the volume by a large unit through the first input, and change the volume by a small unit through the second input.

Figure 11A:
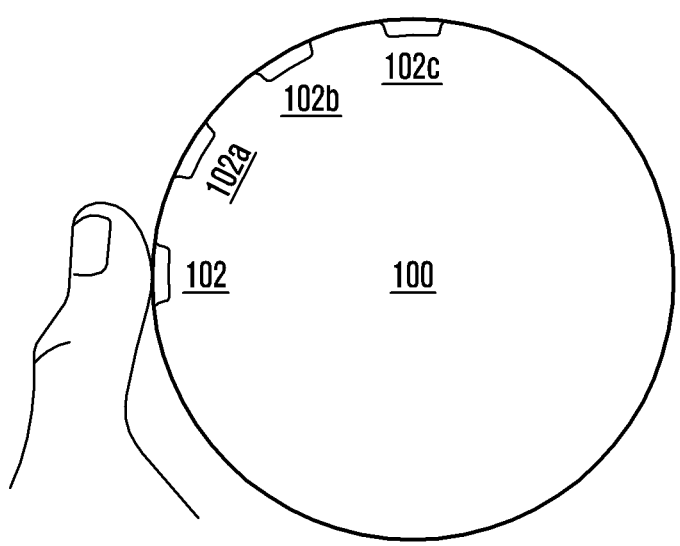
FIGS. 11A to 11D are example illustrations in which an item displayed in a wearable device is changed based on selecting a particular blob among a plurality of blobs according to various embodiments of the present disclosure.

FIG. 11A is an example illustration in which a plurality of blobs are displayed in a wearable device when a blob is touched according to an embodiment of the present disclosure.

Referring to FIG. 11A, when a user performs a tap and hold gesture (indicated with a user's thumb) on the curved periphery associated with the blob 102, a plurality of blobs namely 102*a*, 102*b*, and 102*c* are displayed in the wearable device 100. Each blob among the plurality of blobs 102*a*, 102*b*, and 102*c* corresponds to an item in the wearable device. In an example, the blob 102*a* corresponds to a media application. The blob 102*b* corresponds to a call application. The blob 102*c* corresponds to a message application.

Figure 11B:
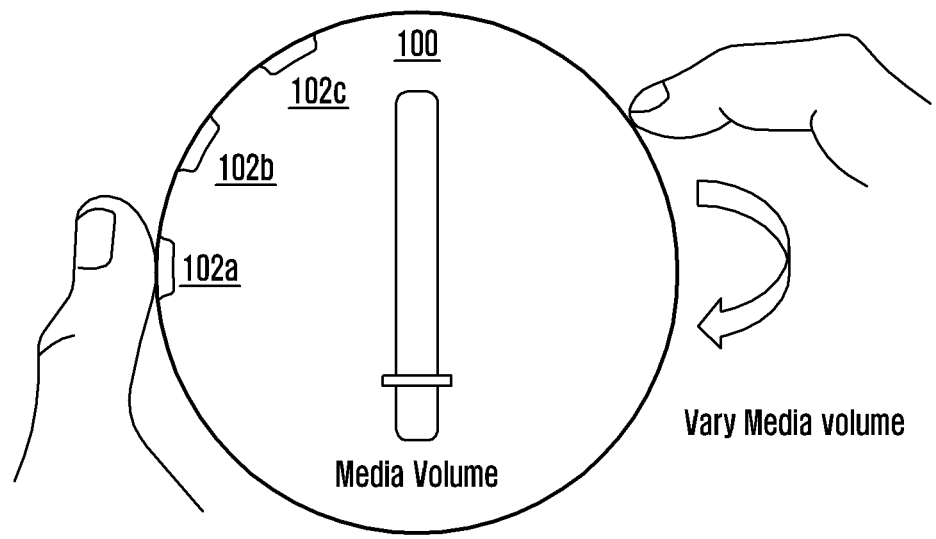
Figure 11C:
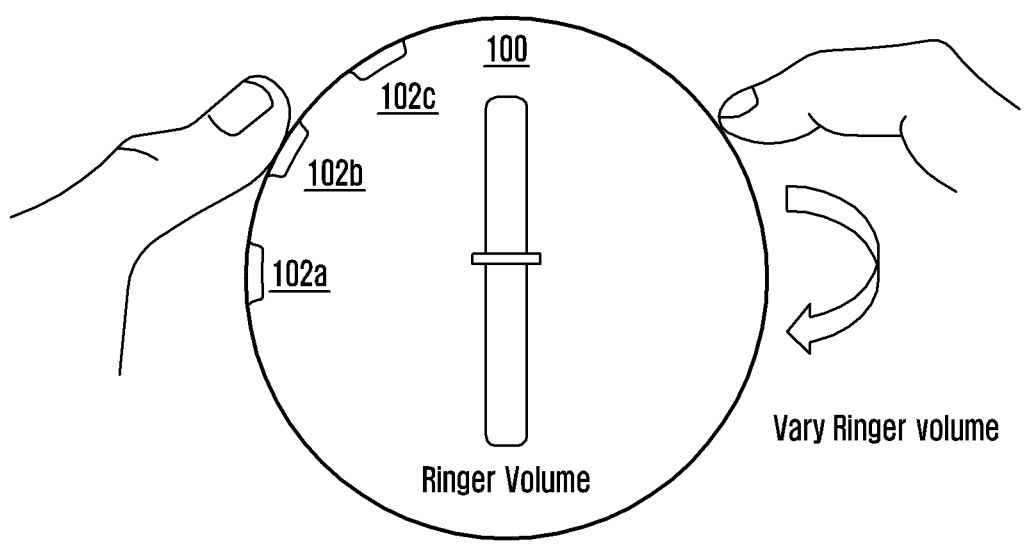
Figure 11D:
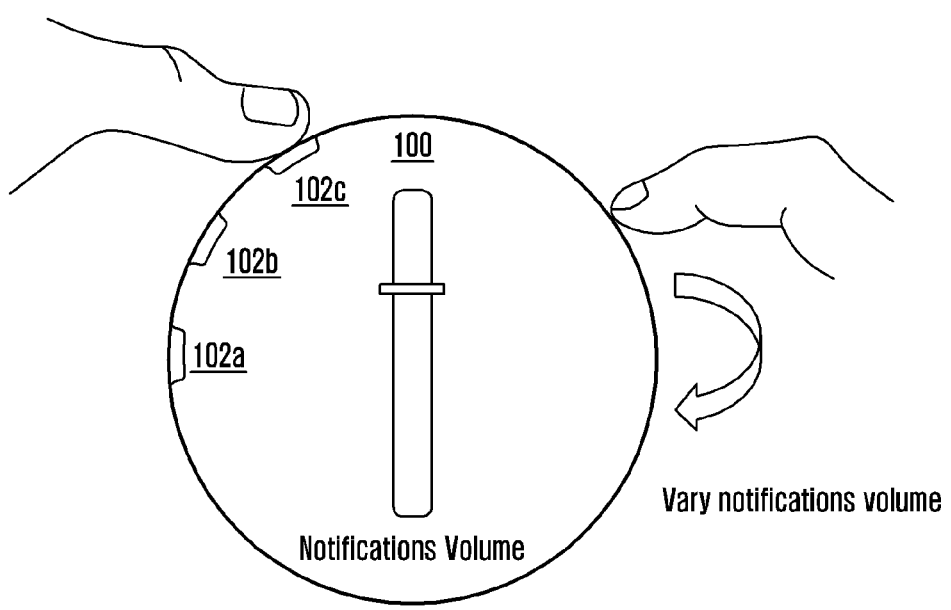

FIGS. 11B to 11D are example illustrations in which an item displayed in a wearable device is changed based on selecting a particular blob among a plurality of blobs according to various embodiments of the present disclosure.

Referring to FIGS. 11B to 11D, the wearable device 100 displays the plurality of blobs namely blob 102*a*, blob 102*b*, and blob 102*c*. The volume feature of the media application is displayed when the user performs the tap and hold gesture on the curved periphery associated with the blob 102*a* as shown in FIG. 11B. The volume of the media application can be raised or lowered based on the directional gesture performed along the curved periphery as shown in FIG. 11B.

When the user performs the tap and hold gesture on the curved periphery associated with the blob 102*b*, the wearable device 100 displays a ringer volume as shown in FIG. 11C. The ringer volume can be raised or lowered based on the directional gesture performed along the curved periphery as shown in FIG. 11C. In a similar manner, when the user performs the tap and hold gesture on the curved periphery associated with the blob 102*c*, the wearable device 100 displays a notifications volume as shown in FIG. 11D. The notifications volume can be raised or lowered based on the directional gesture performed along the curved periphery as shown in FIG. 11D.

Figure 12A:
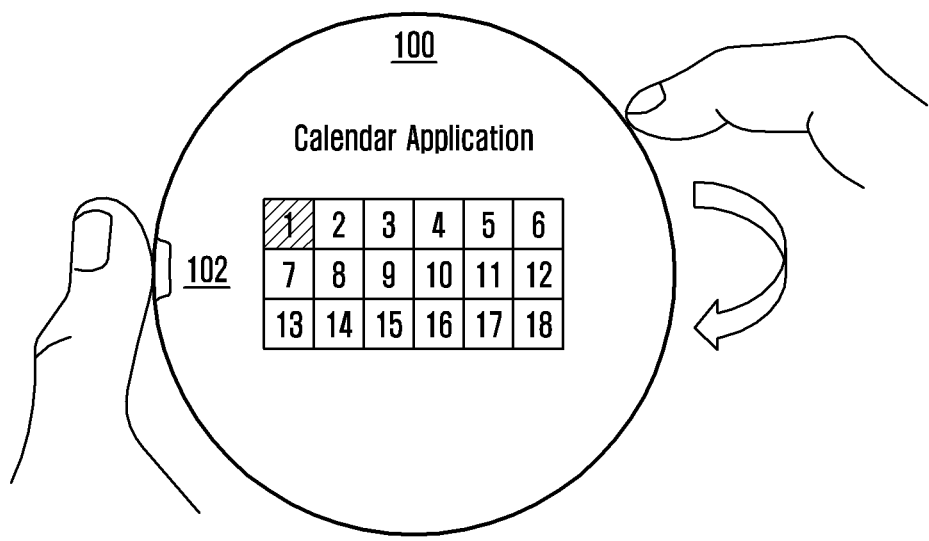
FIGS. 12A to 12C are example illustrations in which a date in a calendar application is selected according to various embodiments of the present disclosure.
Figure 12B:
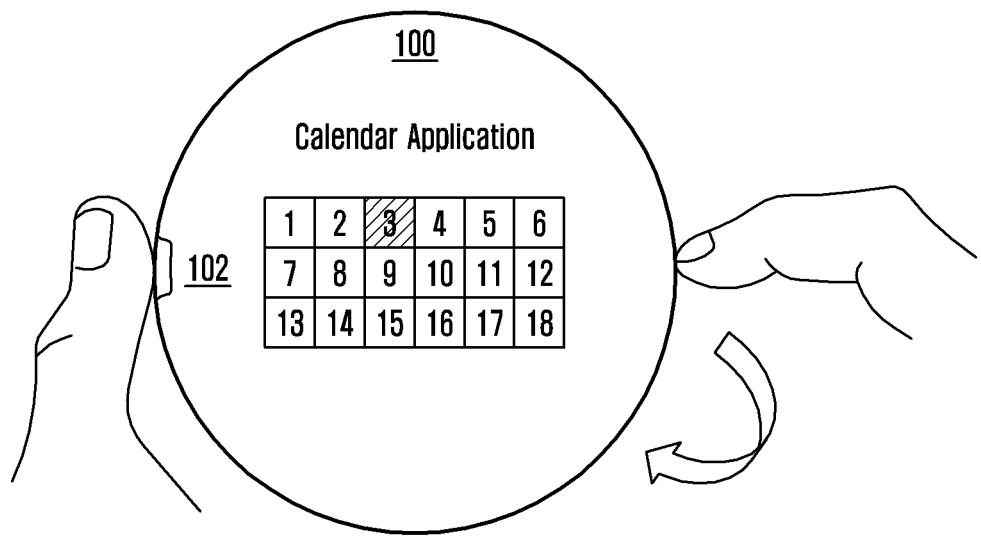
Figure 12C:
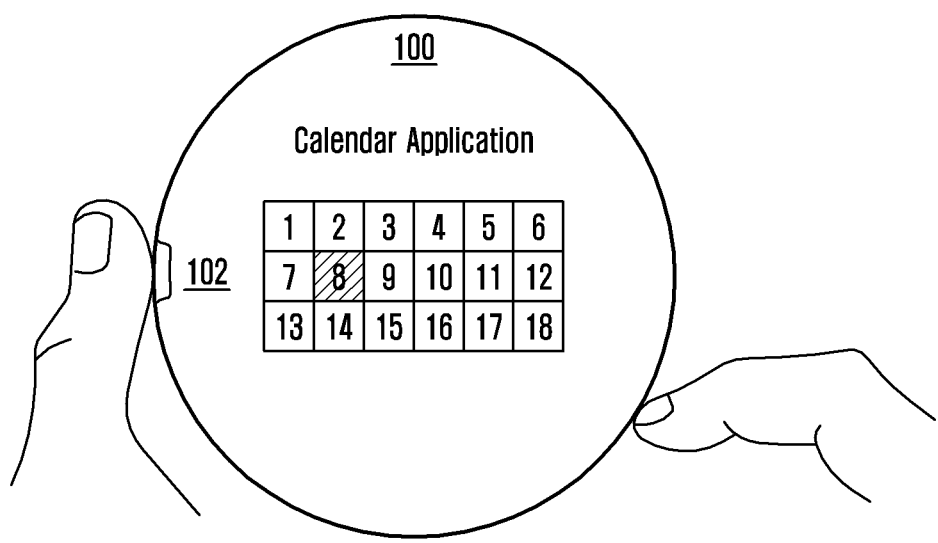

FIGS. 12A to 12C are example illustrations in which a date in a calendar application is selected according to various embodiments of the present disclosure.

Referring to FIG. 12A, the wearable device 100 displays the calendar application along with the blob 102 on the screen. As depicted in FIG. 12A, the user performs a tap and hold gesture on the curved periphery associated with the blob 102. When the tap and hold gesture is performed on the curved periphery, the date ('1' as shown in FIG. 12A) is displayed on the screen of the wearable device 100 is selected.

Referring to FIG. 12B, when the user performs the directional gesture along the curved periphery, in conjunction with the tap and hold gesture on the curved periphery, the date in the calendar application is selected as "3" as shown FIG. 12B, based on the amount of movement of the directional gesture.

When the user continues to perform the directional gesture along the curved periphery, in conjunction with the tap and hold gesture, the date is selected as 8, based on the amount of movement of the directional gesture as shown in FIG. 12C.

Figure 13A:
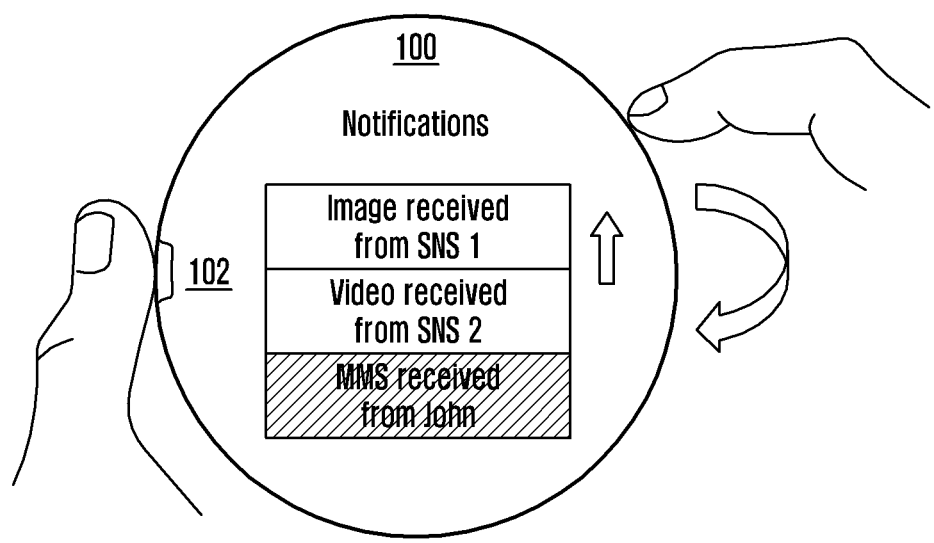
FIGS. 13A to 13C are example illustrations in which a notification received from any of various social networking sites (SNSs) is accessed with a user interaction according to various embodiments of the present disclosure.
Figure 13B:
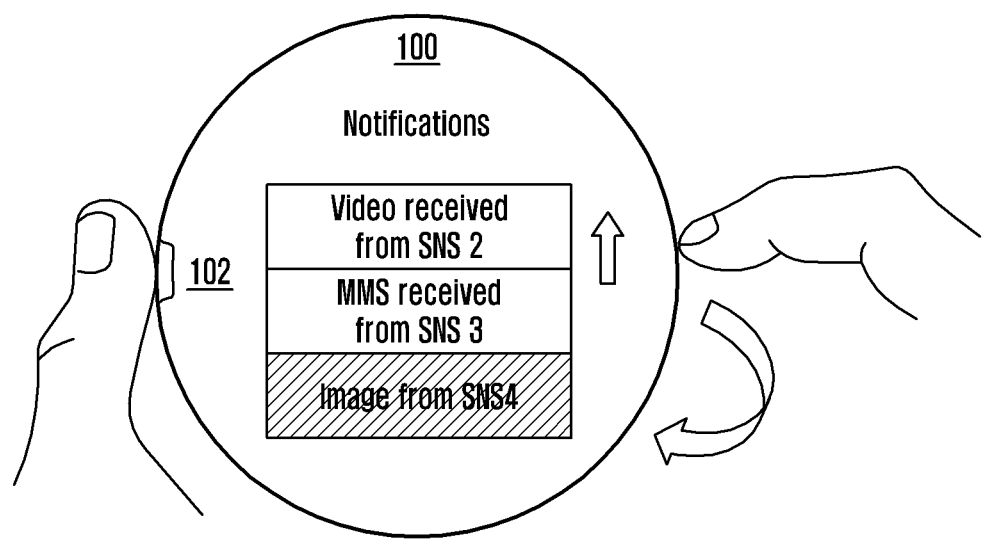
Figure 13C:
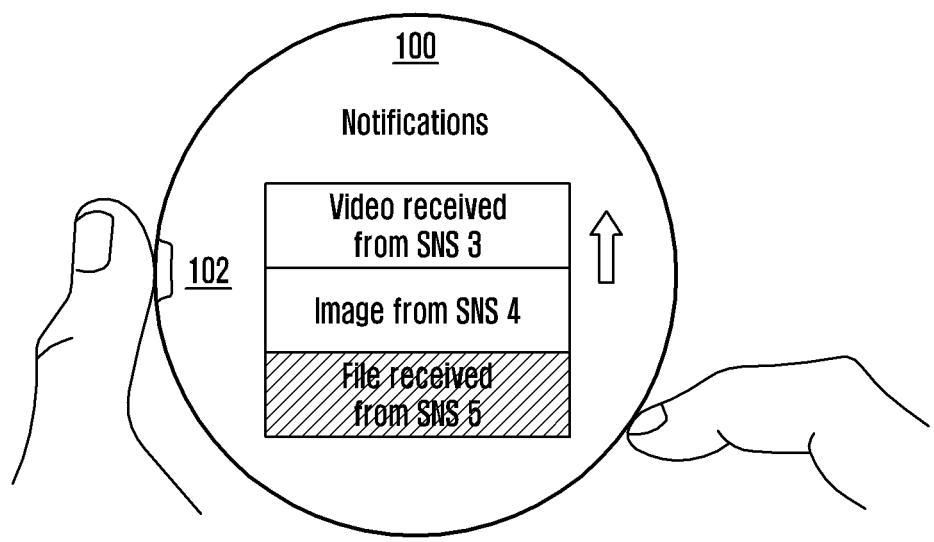

FIGS. 13A to 13C are example illustrations in which a notification received from any of various SNSs is accessed with a user interaction, according to various embodiments of the present disclosure.

Referring to FIG. 13A, the wearable device 100 may display one or more notifications received from various SNSs along with the blob on the screen. The user performs a tap and hold gesture on the curved periphery associated with the blob when the notifications received from various SNSs are displayed on the screen of the wearable device 100 as shown in FIG. 13A.

Referring to FIG. 13B, when the user performs the directional gesture along the curved periphery, in conjunction with the tap and hold input on the curved periphery, the notifications received from various SNSs are scrolled based on the amount of movement of the directional gesture.

When the user continues to perform the directional gesture along the curved periphery, in conjunction with the tap and hold input on the curved periphery, the notifications received from various SNSs is scrolled further, based on the amount of movement of the directional gesture as shown in FIG. 13C.

Figure 14A:
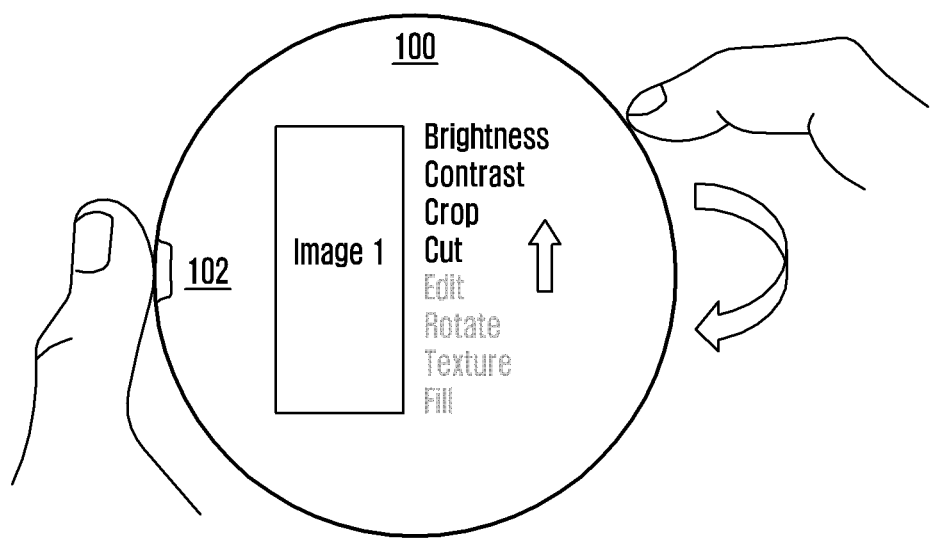
FIGS. 14A to 14C are example illustrations in which various options for enhancing an image are accessed with a user interaction according to various embodiments of the present disclosure.
Figure 14B:
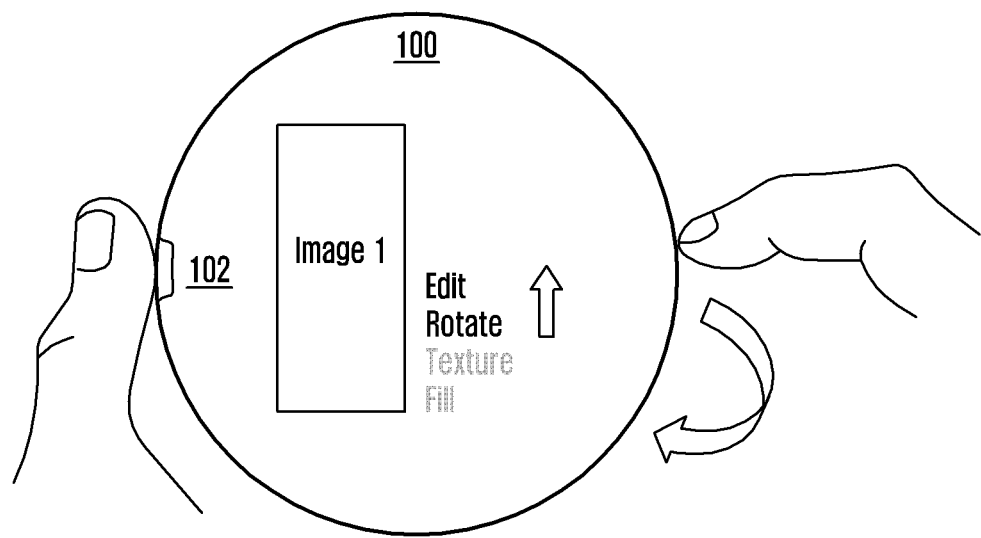
Figure 14C:
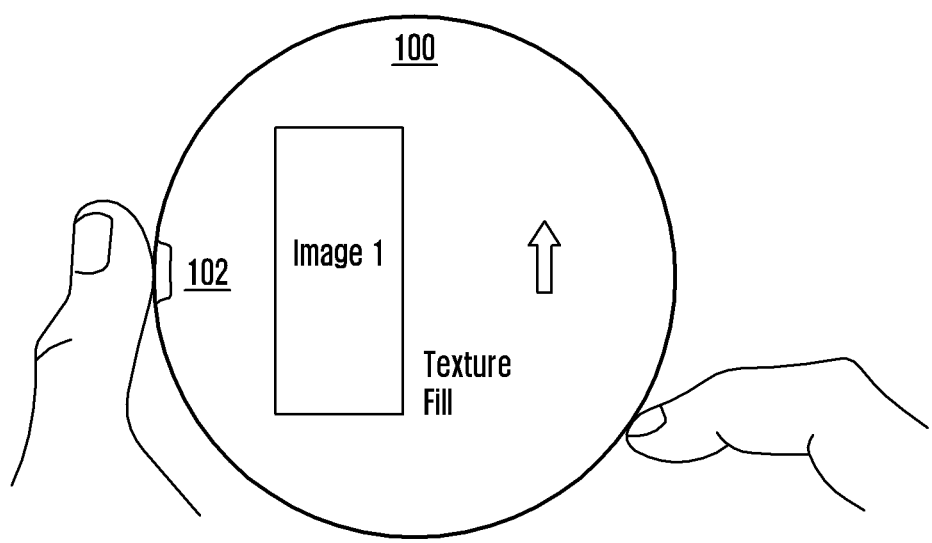

FIGS. 14A to 14C are example illustrations in which various options for enhancing an image are accessed with the user interaction according to various embodiments of the present disclosure.

Referring to FIG. 14A, the wearable device 100 displays an image 1 with various tools for enhancing the image, along with the blob 102 on the screen. A tap and hold gesture is performed on the curved periphery associated with the blob 102 when the image 1 with various tools is displayed on the screen of the wearable device 100 as shown in FIG. 14A.

Referring to FIG. 14B, when the user performs the directional gesture along the curved periphery, in conjunction with the tap and hold gesture, the various tools are scrolled based on the amount of movement of the directional gesture along the curved periphery.

When the user continues to perform the directional gesture along the curved periphery, in conjunction with the tap and hold gesture, the notifications received from various SNSs are scrolled further, based on the amount of movement of the directional gesture as shown in FIG. 14C.

Figure 15:
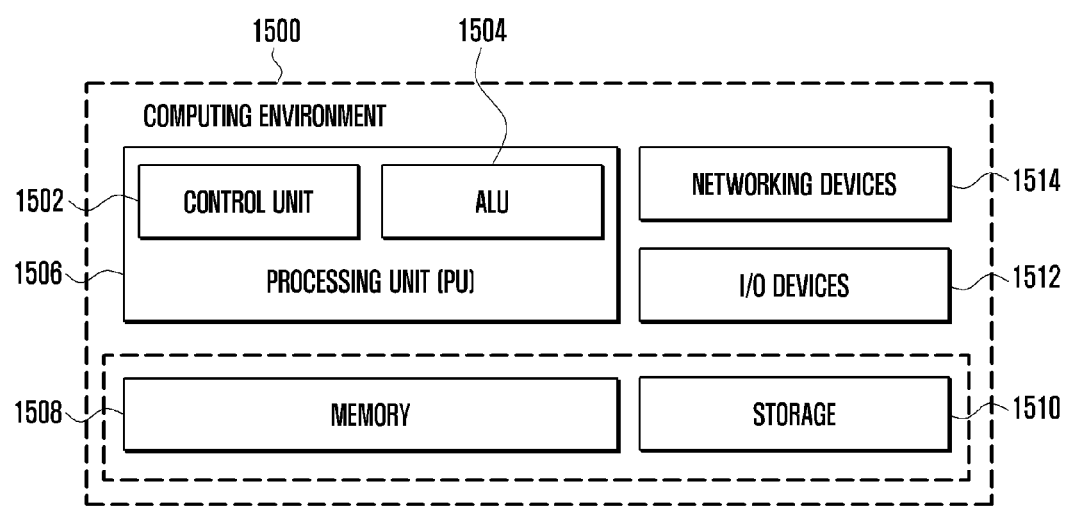
FIG. 15 illustrates a computing environment implementing a method of providing interaction in a wearable device with a curved periphery according to an embodiment of the present disclosure.

FIG. 15 illustrates a computing environment implementing a method of providing interaction in a wearable device with a curved periphery according to an embodiment of the present disclosure.

Referring to FIG. 15, the computing environment 1500 comprises at least one processing unit 1506 that is equipped with a control unit 1502 and an arithmetic logic unit (ALU) 1504, a memory 1508, a storage unit 1510, a plurality of networking devices 1514, and a plurality of input/output (I/O) devices 1512. The processing unit 1506 is responsible for processing the instructions of the algorithm. The processing unit 1506 receives commands from the control unit 1502 in order to perform its processing. Further, any logical and arithmetic operations involved in the execution of the instructions are computed with the help of the ALU 1504.

The overall computing environment 1500 can be composed of multiple homogeneous and/or heterogeneous cores, multiple central processing units (CPUs) of different kinds, special media, and other accelerators. The processing unit 1506 is responsible for processing the instructions of the algorithm. Further, the plurality of processing units 1506 may be located on a single chip or over multiple chips.

The algorithm comprised of instructions and codes required for the implementation are stored in either the memory unit 1508, the storage 1510, or both. At the time of execution, the instructions may be fetched from the corresponding memory 1508 or storage 1510, and executed by the processing unit 1506.

In case of any hardware implementations, various networking devices 1514 or external I/O devices 1512 may be connected to the computing environment to support the implementation through the networking unit and the I/O device unit.

The embodiments disclosed herein can be implemented through at least one software program running on at least one hardware device and performing network management functions to control the elements. The elements shown in the figures include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable device for providing a user interaction, the wearable device comprising:
    a display; and
    at least one processor configured to:
        control the display to display a visual element in response to receiving a first input within a predetermined location associated with triggering interaction with at least one item displayed on the display when a first item and a second item are displayed on the display, the visual element being displayed on the display near a periphery of the wearable device,
        receive a second input associated with the visual element when the visual element, the first item, and the second item are displayed on the display,
        select the first item in response to receiving the second input,
        perform a first action associated with the first item in response to simultaneously receiving a third input associated with the visual element and a fourth input received on another part of the periphery when the visual element is displayed on the display and the first item is selected,
        select the second item in response to receiving a fifth input associated with the visual element when the visual element, the first item, and the second item are displayed on the display and the first item is selected, and
        perform a second action associated with the second item in response to simultaneously receiving the third input and the fourth input when the visual element is displayed on the display and the second item is selected.

2. The wearable device of claim 1, wherein the at least one processor is further configured to:
    in response to receiving the fourth input when the first item is selected, change a feature of the first item by a first increment, and
    in response to simultaneously receiving the third input and a sixth input when the first item is selected, change the feature of the first item by a second increment,
    wherein the first increment is larger than the second increment.

3. The wearable device of claim 1,
    wherein the wearable device further comprises an interface, and
    wherein the interface comprises at least one touch sensor disposed on the periphery.

4. The wearable device of claim 1,
    wherein the wearable device further comprises an interface, and
    wherein the interface is disposed on near of an edge of the display.

5. The wearable device of claim 1, wherein the at least one processor is further configured to vary at least one feature of the first item or the second item in accordance with the second fourth input.

6. The wearable device of claim 1, wherein the at least one processor is further configured to cause to render a portion of the first item or the second item on the display in accordance with the fourth input.

7. The wearable device of claim 1, wherein the at least one processor is further configured to cause to change the first item or the second item in accordance with the fourth input.

8. The wearable device of claim 1, wherein the visual element is displayed at a pre-determined region on the display.

9. The wearable device of claim 8, wherein the pre-determined region is configurable based on a user preference.

10. The wearable device of claim 1,
    wherein, to control the display to display the visual element, the at least one processor is further configured to display a plurality of visual elements in response to receiving the first input when the first item and the second item are displayed on the display, and
    wherein each of the plurality of visual elements is displayed at a respective pre-determined region on the display of the wearable device.

11. The wearable device of claim 10,
    wherein the second input is associated with a first visual element of the plurality of visual elements, and
    wherein each of the plurality of visual elements corresponds to a different item displayed on the display.

12. The wearable device of claim 11,
    wherein the fifth input is associated with a second visual element of the plurality of visual elements.

13. A method of providing a user interaction, the method comprising:
    displaying a visual element in response to receiving a first input within a predetermined location associated with triggering interaction with at least one item displayed on the display when a first item and a second item are displayed on a screen of the wearable device, the visual element being displayed near a periphery of the wearable device;
    receiving a second input associated with the visual element when the visual element, the first item, and the second item are displayed on the display;
    selecting the first item in response to receiving the second input;
    performing a first action associated with the first item;
    in response to simultaneously receiving a third input associated with the visual element and a fourth input received on another part of the periphery when the visual element is displayed on the display and the first item is selected;
    selecting the second item in response to receiving a fifth input associated with the visual element when the visual element is displayed on the display and the first item is selected; and
    performing a second action associated with the second item in response to simultaneously receiving the third input and the fourth input when the visual element, the first item, and the second item are displayed on the display and the second item is selected.

14. The method of claim 13, wherein the method further comprises:

in response to receiving the fourth input when the first item is selected, changing the feature of the first item by a first increment; and in response to simultaneously receiving the third input and a sixth input when the first item is selected, changing the feature of the first item by a second increment, wherein the first increment is larger than the second increment.

15. The method of claim 13, wherein the performing of the second action comprises:

varying at least one feature of the first item or the second item in accordance with the fourth input.

16. The method of claim 13, wherein the performing of the second action comprises:

rendering a portion of the first item or the second item on the screen of the wearable device in accordance with the fourth input.

17. The method of claim 13, wherein the performing of the second action comprises:

changing the first item or the second item in accordance with the fourth input.

18. The method of claim 13, wherein the visual element is displayed at a pre-determined region on the screen of the wearable device.

19. The method of claim 18, wherein the pre-determined region is configurable based on a user preference.

20. The method of claim 13, further comprising:

displaying a plurality of visual elements in response to receiving the first input when the first item and the second item are displayed on the display, wherein each of the plurality of visual elements is displayed at a respective pre-determined region on the screen of the wearable device.

* * * * *